3,610,027
METHOD OF DETERMINING FLEXIBILITY OF ELONGATE BODIES

Walter Woboditsch, Berlin-Kopenick, Germany, assignor to VEB Kabelwerk Oberspree, Berlin-Oberschoneweide, Germany
Filed July 30, 1968, Ser. No. 748,812
Int. Cl. G01n 24/00
U.S. Cl. 73—67.2
2 Claims

ABSTRACT OF THE DISCLOSURE

To determine the flexibility of an elongate body, the latter is clamped in a fixed support so as to leave a depending portion of a given free length, this portion being then subject to forced oscillations to ascertain its natural frequency whereupon the flexibility is calculated as the reciprocal of the product of natural frequency times the square of the free length.

---

Figure 1:
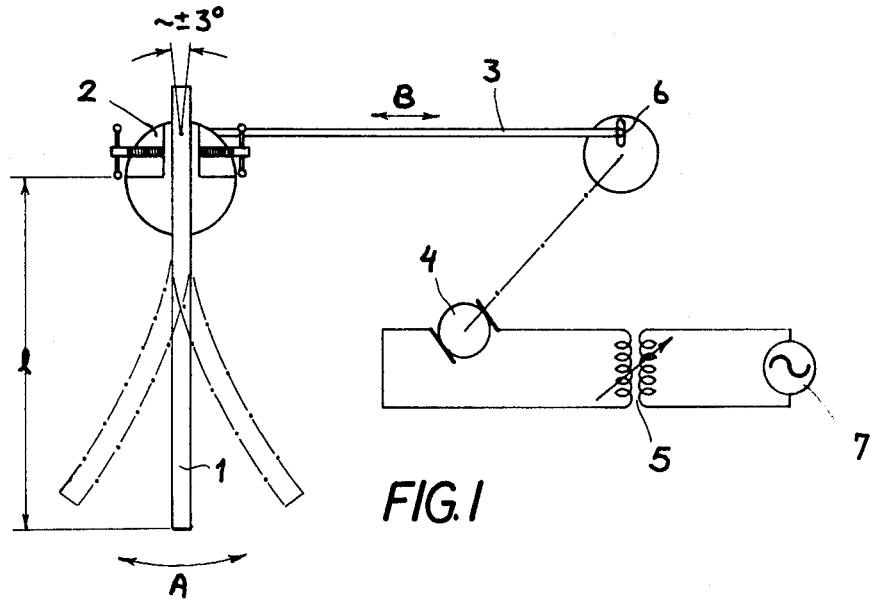

My present invention relates to a method of determining the flexural rigidity or its reciprocal, the flexibility, of filiform bodies such as cables, wires, cord, braid, textile yarns, hemp and steel ropes or hose, as well as of bar-shaped test bodies made of plastic or elastic material.

The behavior of filiform or other elongate bodies under quasi-static stress can be determined by the well-known Locher method. According to this method, the first step is to weigh the specimen whose flexibility is to be determined, in order to find its mass per unit length. The specimen is then horizontally clamped at one end in a fixed support and weighted by loads applied to it at various points along its length. The coefficient of flexibility can now be calculated as a function of the deflection of the free end of the specimen in terms of its free length and specific mass.

The drawback of this method is that the calculations are cumbersome and beyond the capacity of semiskilled personnel.

It is, therefore, the object of my invention to provide a simplified method of determining the flexibility of elongate bodies with elimination of the need for a preliminary ascertainment of their mass.

This object is attained, in accordance with my present invention, by determining the natural frequency $f_o$ of a given free length $l$ of an elongate test body mounted for free oscillation and deriving from this value and from the length $l$ a constant $K_o = f_o l^2$ constituting a measure for the dynamic flexural rigidity of the body, the latter being defined as the product $EI$ of the modulus of elasticity $E$ and the polar moment of inertia $I$ divided by the specific mass $m' = m/l$ where $m$ is the overall mass of the body. The constant $K_o$ can be ascertained with different values of the free length $l$, provided this length does not become so great that $f_o$ drops down to a range in which the vibrations are severely damped and the body, if vertically suspended, begins to swing as a pendulum.

My invention is based on the following physical considerations:

The natural or resonance frequency $f_o$ of an oscillator such as a unilaterally clamped test body of filiform or bar-shaped nature, which is free to execute undamped vibrations about its clamped end, is given by the relation $$f_o = \frac{1}{2\pi}\sqrt{\frac{c}{m}} \qquad (1)$$

where $c$, the spring constant, equals $8EI/l^3$ and is given in ponds per centimeter (p./cm.), the other parameters being given in the following units: $f_o$ in cm.$^{-1}$, $E$ in kp./cm.$^2$, $I$ in cm.$^4$, $m$ in grams (g.), $l$ in cm.

Equation 1 can be rewritten as $$f_o = \frac{1}{2\pi}\sqrt{\frac{8EI}{m'l^4}} = \frac{\sqrt{2}}{\pi l^2}\sqrt{\frac{EI}{m'}} \qquad (2)$$

The natural frequency $f_o$ is thus proportional to the square root of $EI/m'$ and inversely proportional to the square of the length of the oscillating test body.

From Equation 2 we obtain $$K_o \equiv f_o l^2 = \frac{\sqrt{2}}{\pi}\sqrt{\frac{EI}{m'}} \qquad (3)$$

$K_o$ having the dimensions of cm.$^2$/sec. and being referred to hereinafter as the oscillation constant which is a measure of the dynamic flexural rigidity and is independent of the length of the test body whose behavior under quasi-static bending stresses is thus unambiguously determined.

This, however, is valid only for elongate bodies of relatively short length. A longer object acts as a pendulum executing a simple harmonic motion with the frequency $$f_D = \frac{1}{2\pi}\sqrt{\frac{g}{l_o}} \qquad (4)$$

where $g$ (gravity) $= 981$ cm./sec.$^2$ and $l_o$ (reduced length of the pendulum) $= 2l/3$ in the case of a body of uniform cross-section, whence $$f_D^2 l = \frac{3}{8\pi^2} g \qquad (5)$$

Deriving from this relationship an expression $K_D = f_D l^2$, analogous to the oscillation constant $K_o$, we obtain $$K_D = \frac{l^{3/2}}{2\pi}\sqrt{\frac{3g}{2}} \equiv Zl^{3/2} \qquad (6)$$

which, in contradistinction to $K_o$, varies with the length of the oscillating body and is independent of its modulus of elasticity $E$, its moment of inertia $I$ and its specific mass $m'$ so as to be useless as a measure of the flexural rigidity. When plotted on a logarithmic scale, the function of Equation 6 is a straight line of slope 3/2 whose position, determined by the invariable $$Z \equiv \frac{1}{2\pi}\sqrt{\frac{3g}{2}}$$

is independent of the material and cross-section of the vibrating body.

The flexibility $F$ of a test body oscillating pursuant to Equation 3 can be determined as the reciprocal of its oscillation constant $K_o$, i.e.

$$F = \frac{1}{f_o l^2} = \pi\sqrt{\frac{m'}{2EI}} \qquad (7)$$

which shows the flexibility of an elongate body, for example of a cable, increases with its mass per unit length and is inversely proportional to the square root of the product of its modulus of elasticity $E$ and moment of inertia $I$.

Figure 2:
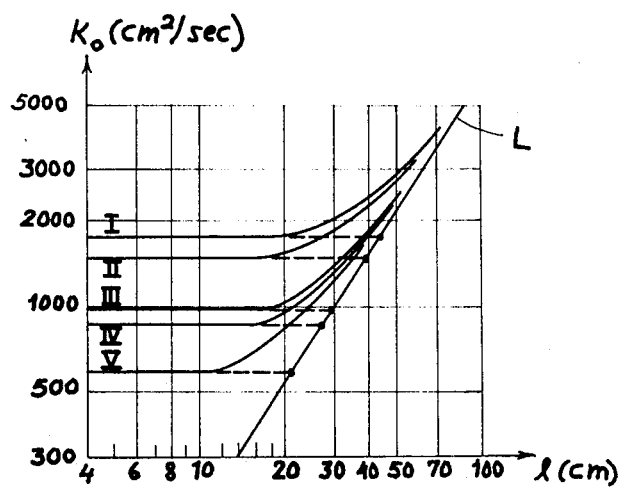

The method of practicing my invention will become more readily apparent from the following description, reference being made to the accompanying drawing in which:

FIG. 1 is a schematic view of an experimental arrangement for determining the natural frequency $f_o$ of different filiform bodies; and FIG. 2 is a diagram plotting the oscillation constants $K_o$ of different electrical cables as a function of their length.

In FIG. 1 a test body 1 of length $l$ is seen to be clamped at one end or some other point in a support 2 and displaceable from its normal depending position in the direction of arrow A by a vibrator shown to comprise a pusher rod 3 which is reciprocated by an adjustable crank drive 6 in the direction of arrow B to excite forced oscillations in body 1. Crank 6 is driven by a motor 4 whose rotary speed $n$ is controllable by means of a variable transformer 5 connected across a source of alternating current 7. By varying the motor speed, the driving frequency can be adjusted until the vibrations of the test body 1 reach a maximum amplitude at resonant frequency $f_o$. This frequency $f_o$ and the known length $l$ of the body now yield the oscillation constant $K_o$ or its reciprocal, the flexibility F, from the expression $K = f_o l^2$ given above.

The curves plotted in FIG. 2 represent the magnitudes of $K = e^v$, laid off on the ordinate, and $l = e^x$, laid off on the abscissa, for five typical power cables of varying lengths, i.e.:

Graph I—light-weight PVC cable with two parallel wires of 0.75 mm. diameter.

Graph II—rubber-insulated cable for heavy-duty household appliances such as vacuum cleaners, with two parallel wires of 0.75 mm. diameter.

Graph III—cable for light appliances such as radios or electric razors, with two parallel stranded cords of 0.75 mm. diameter (42×0.15).

Graph IV—cord of the type specified for graph III but of later manufacture.

Graph V—cable for light appliances with two parallel sheathed cords of 0.5 mm. diameter (64×0.10).

The line L in FIG. 2 represents the function $K_p(l)$ of Equation 6; as $l$ approaches a critical value of $(K_o/Z)^{1/3}$ at the intersection of a corresponding dotted horizontal line with line L, $K_o$ departs from its constant value and tends asymptotically toward $K_p$. Thus, the determination of flexibility with the copper-wire specimens represented by graphs I–V should be carried out with free lengths not exceeding 10 to 12 cm.

It will thus be seen that I have provided a method of determining elasticity which is simple and dependable and which can be carried out on any elongate body of substantially constant cross-section without requiring such body to be sliced or cut open.

I claim:

1. A method of determining the flexibility of a length of copper wiring comprising the steps of clamping said wiring in a vibratile support while leaving a portion of a given free length vertically suspended therefrom; ascertaining the natural frequency of said portion by setting said support in forced horizontal oscillations, measuring the amplitude of vibration of the free lower end of said portion and varying the frequency of said oscillations until said amplitude reaches a maximum; and deriving a measure of said flexibility from the product of said natural frequency times the square of said free length, the magnitude of said free length being less than that giving rise to a pendulum swing.

2. A method as defined in claim 1 wherein said copper wiring is less than 1 mm. in diameter, said free length being limited to a maximum of approximately 10 cm.

References Cited

UNITED STATES PATENTS

| | | | |
|---|---|---|---|
| 3,303,705 | 2/1967 | Dostal | 73—505 |
| 2,960,862 | 11/1960 | Spurr et al. | 73—67.2 |
| 3,319,460 | 5/1967 | Barigant | 73—67.2 |

RICHARD C. QUEISSER, Primary Examiner

A. E. KORKOSZ, Assistant Examiner